US012795310B2

(12) United States Patent
Schinkel-Bielefeld et al.

(10) Patent No.: US 12,795,310 B2
(45) Date of Patent: Nov. 10, 2026

(54) METHOD, HEARING SYSTEM AND COMPUTER READABLE MEDIUM FOR ASSESSING SPEECH INTELLIGIBILITY OF A TEST PARTICIPANT, IN PARTICULAR A WEARER OF A HEARING INSTRUMENT

(71) Applicant: Sivantos Pte. Ltd., Singapore (SG)

(72) Inventors: Nadja Schinkel-Bielefeld, Erlangen (DE); Kaja Strobel, Erlangen (DE); Maja Serman, Erlangen (DE)

(73) Assignee: Sivantos Pte. Ltd., Singapore (SG)

( * ) Notice: Subject to any disclaimer, the term of this patent is extended or adjusted under 35 U.S.C. 154(b) by 82 days.

(21) Appl. No.: 18/805,762

(22) Filed: Aug. 15, 2024

(65) Prior Publication Data

US 2025/0071489 A1 Feb. 27, 2025

Related U.S. Application Data

(63) Continuation of application No. PCT/EP2023/083357, filed on Nov. 28, 2023.

(30) Foreign Application Priority Data

Aug. 25, 2023 (EP) .................................... 23193488
Sep. 6, 2023 (EP) .................................... 23195772

(51) Int. Cl.
*H04R 25/00* (2006.01)

(52) U.S. Cl.
CPC ............ *H04R 25/70* (2013.01); *H04R 25/50* (2013.01); *H04R 2225/39* (2013.01); *H04R 2225/41* (2013.01); *H04R 2225/43* (2013.01); *H04R 2225/55* (2013.01)

(58) Field of Classification Search
None
See application file for complete search history.

(56) References Cited

U.S. PATENT DOCUMENTS 10,966,034 B2 * 3/2021 Andersen ............ G10L 21/0364
11,615,801 B1 * 3/2023 Lezzoum ............ G10L 21/0232
704/233
2004/0066944 A1 4/2004 Leenen et al.
2004/0190739 A1 9/2004 Bachler et al.
2011/0207094 A1 8/2011 Bellanova et al.
2021/0353182 A1 11/2021 Dillon et al.
(Continued)

FOREIGN PATENT DOCUMENTS

EP 1414271 A2 4/2004
WO 2008009142 A1 1/2008
(Continued)

*Primary Examiner* — Brian T Pendleton
(74) *Attorney, Agent, or Firm* — Laurence A. Greenberg; Werner H. Stemer; Ralph E. Locher

(57) ABSTRACT

A method assesses speech intelligibility of a test participant, in particular a wearer of a hearing instrument. In the method, a plurality of speech intelligibility tests are performed in normal life situations of the test participant, using a mobile device carried by the test participant. In each of the speech intelligibility tests, a number of phonemes or phoneme combinations are presented acoustically to the test participant, wherein the test participant is invited to indicate the presented phoneme or phoneme combination. Results of each of the speech intelligibility tests are stored.

11 Claims, 3 Drawing Sheets

(56) References Cited

U.S. PATENT DOCUMENTS

2022/0007116 A1 1/2022 Lunner et al.
2023/0179934 A1* 6/2023 Gavish ................. H04R 25/505
381/313

FOREIGN PATENT DOCUMENTS

WO 2009104126 A1 8/2009
WO WO-2021099834 A1 * 5/2021 ............. A61B 5/123

* cited by examiner

METHOD, HEARING SYSTEM AND COMPUTER READABLE MEDIUM FOR ASSESSING SPEECH INTELLIGIBILITY OF A TEST PARTICIPANT, IN PARTICULAR A WEARER OF A HEARING INSTRUMENT

CROSS-REFERENCE TO RELATED APPLICATION

This application is a continuation, under 35 U.S.C. § 120, of copending International Patent Application PCT/EP2023/083357, filed Nov. 28, 2023, which designated the United States; this application also claims the priority, under 35 U.S.C. § 119, of European Patent Applications EP 23 193 488.6, filed Aug. 25, 2023, and EP 23 195 772.1, filed Sep. 6, 2023; the prior applications are herewith incorporated by reference in their entireties.

FIELD AND BACKGROUND OF THE INVENTION

The invention relates to a method for assessing speech intelligibility of a test participant, in particular a wearer of a hearing instrument.

In general, a hearing instrument is an electronic device being configured to support the hearing of person wearing it (which person is called the "user" or "wearer" of the hearing instrument). In particular, the invention relates to hearing instruments that are specifically configured to at least partially compensate a hearing impairment of a hearing-impaired user. Such hearing instruments include "hearing aids". In addition to such hearing aids, there are hearing instruments that are configured to support the hearing of normal-hearing users (i.e. persons without a hearing impairment). Such hearing instruments, being sometimes referred to as "Personal Sound Amplification Products" (PSAP), may be provided, e.g., to enhance the hearing of the wearer in complex acoustic environments or to protect the hearing of the wearer from damage or overstress.

Hearing instruments, in particular hearing aids, are typically configured to be worn in or at the ear of the user, e.g. as a Behind-The-Ear (BTE) or In-The-Ear (ITE) device. With respect to its internal structure, a hearing instrument normally contains an (acousto-electrical) input transducer, a signal processor, and an output transducer. During operation of the hearing instrument, the input transducer captures a sound signal from an environment of the hearing instrument and converts it into an input audio signal (i.e. an electrical signal transporting a sound information). In the signal processor, the input audio signal is processed, in particular amplified dependent on frequency, e.g., to compensate the hearing-impairment of the user. The signal processor outputs the processed signal (also called output audio signal) to the output transducer. Most often, the output transducer is an electro-acoustic transducer (also called "receiver") that converts the output audio signal into a processed airborne sound which is emitted into the ear canal of the user. Alternatively, the output transducer may be an electro-mechanical transducer that converts the output audio signal into a structure-born sound (vibrations) that is transmitted, e.g., to the cranial bone of the user.

Furthermore, besides classical hearing aids, there are implanted hearing aids such as cochlear implants, and hearing instruments the output transducers of which directly stimulate the auditory nerve of the user.

The term "hearing system" denotes one device or an assembly of devices and/or other structures providing functions required for the operation of a hearing instrument. A hearing system may consist of a single stand-alone hearing instrument. As an alternative, a hearing system may comprise a hearing instrument and at least one further electronic device which may, e.g., be one of another hearing instrument for the other ear of the user, a remote control, and a programming tool for the hearing instrument. Moreover, modern hearing systems often comprise a hearing instrument and a software application for controlling and/or programming the hearing instrument, which software application (hereinafter referred to as the "hearing app") is or can be installed on a computer, in particular a mobile communication device such as a mobile phone (smartphone). In the latter case, typically, the computer is not a part of the hearing system, but is only used by the hearing system as a resource of data storage, numeric power, and communication services. Most often, the computer (in particular, the mobile communication device) on which the hearing app is or may be installed will be manufactured and sold independently of the hearing system.

For evaluating new functional features of a hearing instrument as well as for diagnosing a hearing loss and fitting a hearing instrument to the wearer's satisfaction, it is important to collect information on the hearing and potential hearing problems of the (current or future) wearer of the hearing instrument and/or on the benefit of the hearing instrument to the wearer.

Conventionally, for health care professionals (HCP), the main source of information for assessing the hearing of a person are measured audiogram data (i.e. the frequency dependent hearing threshold for pure tones at different frequency). However, there are certain aspects of a person's hearing, in particular speech intelligibility, for which audiogram data have limited significance only.

Generally, the speech intelligibility (SI) of a person can be measured. Many such SI tests have been developed for laboratory sessions in which a test participant (i.e. the wearer of a hearing instrument or another person) may, e.g., be invited to recognize and distinguish between different similar phonemes or phoneme combinations (such as "akka", "alla", "atta", . . . ) played to him or her. However, it is not clear how generalizable such laboratory tests are to real life and the situations that matter to the test participant.

As an alternative, the test participant may be invited to provide subjective reports on his or her speech intelligibility in real life, e.g. using a retrospective questionnaire. However, subjective speech intelligibility may depend greatly on factors that are not directly related to the participant's hearing, such as lip reading, context evaluation and/or using other cues which facilitate understanding. Moreover, subjective speech intelligibility of a person may significantly depend on his or her emotional state, on the communication partner (e.g. the communication partner's efforts to be understood and/or the familiarity of the person with the communication partner) and/or accents or other speech idiosyncrasies used in communication. Finally, in a retrospective report, the remembered and reported speech intelligibility will often differ from the real-time experience of the test participant as the remembered experience of the test participant will change over time.

SUMMARY OF THE INVENTION

Hence, an objective test in the usual environment of the test participant would be useful in order to have an objective measure of a person's speech intelligibility in his/her individual situations of interest.

According to the invention, this goal is met by a method for assessing speech intelligibility of a test participant, in particular a wearer of a hearing instrument, according to the independent claim. Preferred embodiments of the invention are described in the dependent claims and the subsequent description.

In the method, a plurality of (phoneme-based) speech intelligibility tests are performed in normal life situations of the test participant, using a mobile device carried by the test participant. In each of the speech intelligibility tests, a number of phonemes or phoneme combinations are presented acoustically to the test participant, wherein the test participant is invited to indicate the presented phoneme or phoneme combination. Results of each of the speech intelligibility tests are stored.

It is intended that the speech intelligibility tests (SI test) according to the invention can be carried out easily in normal life situations of the test participant. To this end, preferably, the method is configured to be executed entirely on a mobile device (e.g. a smartphone). Preferably, the method is implemented as a function of a hearing app being attributed to a hearing instrument, as a part of a hearing system. However, in alternative embodiments of the invention, parts of the functionality implementing the method may be installed and executed on a stationary system such as a cloud computer. In such embodiments, the mobile device mentioned above (such as a smartphone, a tablet computer, a smart watch, smart glasses, etc.) is communicatively connected to said stationary system and is used, at least, for interacting with the test participant, e.g. for providing phonemes or phoneme combinations to the test participant and gathering a response of the test participant.

Also, it should be possible to carry out the SI tests quickly, such that they can be carried out often without significantly interfering with the daily life of the test participant. Therefore, in preferred embodiments of the invention, the SI test is developed as phoneme test in which a small number of phonemes or phoneme combinations (e.g. between 5 and 20 phonemes or phoneme combinations) is played to the test participant, e.g. via a speaker of the mobile device, a hearing instrument or an ear phone connected (wirelessly or via a wired connection) to the mobile device. The test participant is then invited to indicate a recognized phoneme or phoneme combination, e.g. via a touch screen of the mobile device or by speech interaction.

In an exemplary embodiment, the SI test contains a number of 10 to 12 phonemes to be presented to the test participant. In this case, the SI test can be done in about a minute and can be performed repeatedly and in various situations by the test participant. In a preferred embodiment of the invention, the phonemes presented in the SI test contain both a number of easy understandable phoneme (such as, e.g. "*atta*", "amma", "alla"), some hard to understand or hard to distinguish phonemes (such as, e.g., "assa" and "asha") and, preferably, some phonemes of medium phoneme difficulty, in order to make sure that the test participant does not become frustrated if he or she does the test in a difficult acoustic environment, but to also make sure that the test is not too easy in quiet environments.

Alternatively, a staircase procedure is be followed. This means that the phonemes are varied in sound pressure level and/or in phoneme difficulty according to the performance of the participant in the last (or a predefined number of previous) trials. The term "phoneme difficulty" is a measure that is attributed to any phoneme (e.g. by a provider of the method or the hearing system or software program performing the method) and describes the difficulty to understand that particular phoneme. In particular, the "phoneme difficulty" may be defined on a scale, e.g. from 1 to 5 (where 1 may be attributed to phonemes that are understood very easily, whereas 5 may be attributed to very hard to understand phonemes). Herein, the phoneme difficulty may be defined to vary in dependence of the type of hearing loss. Thus, a particular phoneme may have different phoneme difficulty for different types of hearing loss.

In an embodiment of the invention, the SI test starts with predefined phoneme difficulty (i.e. only phonemes of that phoneme difficulty, e.g. medium phoneme difficulty, are provided to the participant) and/or with a predefined sound pressure level, e.g. medium sound pressure. Hereafter, the phoneme difficulty is increased or decreased (i.e. phonemes of a higher or lower phoneme difficulty are provided to the participant) and/or the sound pressure level is decreased or increased in dependence of whether or not the test participant understood the last phoneme (or a predefined number of previous phonemes) correctly. E.g., if the test participant understood the last phoneme correctly, then in a next step a phoneme with a higher phoneme difficulty and/or at a lower sound pressure level is provided. Otherwise, a phoneme with a lower phoneme difficulty and/or at a higher sound pressure level is provided.

Certain embodiments of the invention are specifically designed to be applied to test participants with a known type or degree of hearing loss. In these embodiments, preferably, the difficulty of the combination of the presented phonemes or phoneme combinations is selected as function of the type or degree of hearing loss. Alternatively or additionally, the difficulty of the combination of the presented phonemes or phoneme combinations may be selected in dependence of the acoustic environment.

In an embodiment, the method may be configured such that the test participant may start the SI test at his or her own discretion (i.e. whenever he or she decides to perform the test). However, in order to ensure frequent repetition of SI test, the method is preferably designed to repeatedly invite the test participant to perform the SI test. Such invitations may be issued within the method, e.g.:

by outputting a text message or graphical symbol to the test participant via a screen of the mobile device, and/or by outputting an acoustic signal (e.g. a ring tone) via a speaker of the mobile device, a hearing instrument or an ear phone connected (wirelessly or via a wired connection) to the mobile device, and/or and/or by tactile signal such as vibration alarm (e.g. via a hearing instrument, a smartphone, or a smart watch).

In embodiments of the invention, the invitations may be issued, e.g. in regular, irregular, or random intervals.

In further embodiments of the invention, the method may be configured to (continuously or repeatedly) evaluate the acoustic environment of the wearer and the mobile device on which the method is executed, e.g.:

- by recording an environmental sound using a microphone of the mobile device or a hearing instrument connected thereto and to evaluate the recorded sound for predefined characteristics of the acoustic environment, e.g. at least one of the mean or maximum sound level, a temporal fluctuation of the sound level, the sound spectrum, the signal-to-noise ratio, the spatial distribution of the sound, etc., and/or
- by accessing a sound classifier of a hearing instrument connected to the mobile device; such sound classifier may, for instance, classify the acoustic environment of the hearing instrument as one of "silence", "speech in quiet", "speech in noise", "music", "noise", etc.

In these embodiments, the method may be configured to issue an invitation to carry out the SI test to the test participant, whenever a (significant) change of the acoustic environment is detected.

In preferred embodiments of the invention, the method comprises collecting information on the acoustic environment at the respective time at which each of the SI tests is performed and storing said information together with the results of the respective SI test. The information on the acoustic environment may be collected as described above.

In further embodiments of the invention, the test participant may be invited to answer questions relating to his or her subjective speech understanding (e.g. by inviting the test participant to select a number of a scale between 0 and 10) and/or to subjective contextual information related to the respective speech intelligibility test, for example on his or her listening intention, and/or mood (e.g. by inviting the test participant to select one of "relaxed", "exited", "tired", "stressed", "sad", "angry", and "other"), and/or stress level (e.g. on a scale between 0 and 10), and/or listening effort (e.g. on a scale between 0 and 10).

The term "listening intention" generally denotes a measure indicating the importance of understanding in a current situation of the test participant or, in other words, a degree of understanding required in said situation. On the one hand, in certain situations, e.g. for announcements in train stations and airports or in a business context, understanding every word may be crucial. On the other hand, in other situations such as leisurely listening to a conversation of other people, getting a basic idea of the topic may serve the needs of the listening person. In certain embodiments of the invention, the test participant may be invited to indicate his or her listening intention as a quantitative measure (e.g. by selecting a number on a scale from 0 to 10, wherein 0 may indicate a lowest degree of understanding required whereas 10 indicates a maximum degree of understanding required). As an alternative, the test participant may be invited to specify his or her current situation or may be provided with a number of situations for selection (e.g. "train station/airport", "business meeting", "private conversation", "cinema/TV", "leisure", "bus/train", etc.). In the latter case, a typical listening intention (i.e. typical degree of understanding required is implied by each of said situations). For instance, situations such as "train station/airport", "business meeting", "private conversation" are associated with a high degree of understanding required;

situations such as "private conversation", "cinema/TV" are associated with a medium degree of understanding required; and situations such as "leisure", "bus/train" are associated with a low degree of understanding required.

A "catch-all situation "(e.g. "other") may be provided for selection in order to provide support for non-predefined situations. This "catch-all situation" may be attributed to a medium degree of understanding required.

Preferably, the test participant is invited to answer said questions immediately (e.g. not more than, at most, 1 to 5 minutes) before or after the respective SI test.

In preferred embodiments of the method, the collected information, i.e. the results of several SI tests as well as, if applicable, the respective information on the acoustic environment and/or the test participant's answer to the at least one question are grouped (pooled or clustered) for similar situations, wherein the similarity of said situations may be characterized, e.g., by similar characteristics of the acoustic environment and/or similar contextual information (e.g. listening intention, mood, stress level and/or listening effort of the test participant), in order to determine an estimate of test participant's speech understanding in different situations based on the groups.

In particular, the method may be configured to perform repeated SI tests and to collect the results in the form of an Ecological Momentary Assessment (EMA) study.

As mentioned before, preferably, the method according to the invention is implemented as software for installation and execution on a computer, e.g. a mobile device such as a smartphone, etc. Thus, an embodiment of the invention is a software program product to be executed by a processor, in particular a processor of a mobile device such as a smartphone, the software program product containing machine-readable instructions that cause the processor to carry out the method according to the invention (as described above) when the machine-readable instructions are executed on the processor. Another embodiment of the invention is a machine-readable data storage medium containing a software program product as described above.

A further embodiment of the invention is a hearing system containing a hearing instrument, in particular a hearing aid, which hearing instrument may be realized in anyone of the embodiments described in the introduction part of this description, in particular as a BTE device or an ITE device. The hearing system may further comprise a mobile device or a software application (hearing app) to be installed on a mobile device (in particular a smartphone), wherein the software application is configured to perform the method according to the invention when running on the mobile device. In the latter case, preferably, the mobile device itself is not a part of the hearing system but manufactured and sold independently thereof.

In general, the software program product, the machine-readable data storage medium and the hearing system according to the invention are configured to perform the method according to the invention. Moreover, any embodiment of the method has a corresponding embodiment of the software program product, the machine-readable data storage medium and the hearing system, respectively. Therefore, all explanations and notes as to variations, advantages, and effects of the different embodiments of the method do equally apply and can be transferred to the corresponding embodiments of the software program product, the machine-readable data storage medium and the hearing system, and vice versa.

Other features which are considered as characteristic for the invention are set forth in the appended claims.

Although the invention is illustrated and described herein as embodied in a method for assessing speech intelligibility of a test participant, in particular a wearer of a hearing instrument, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
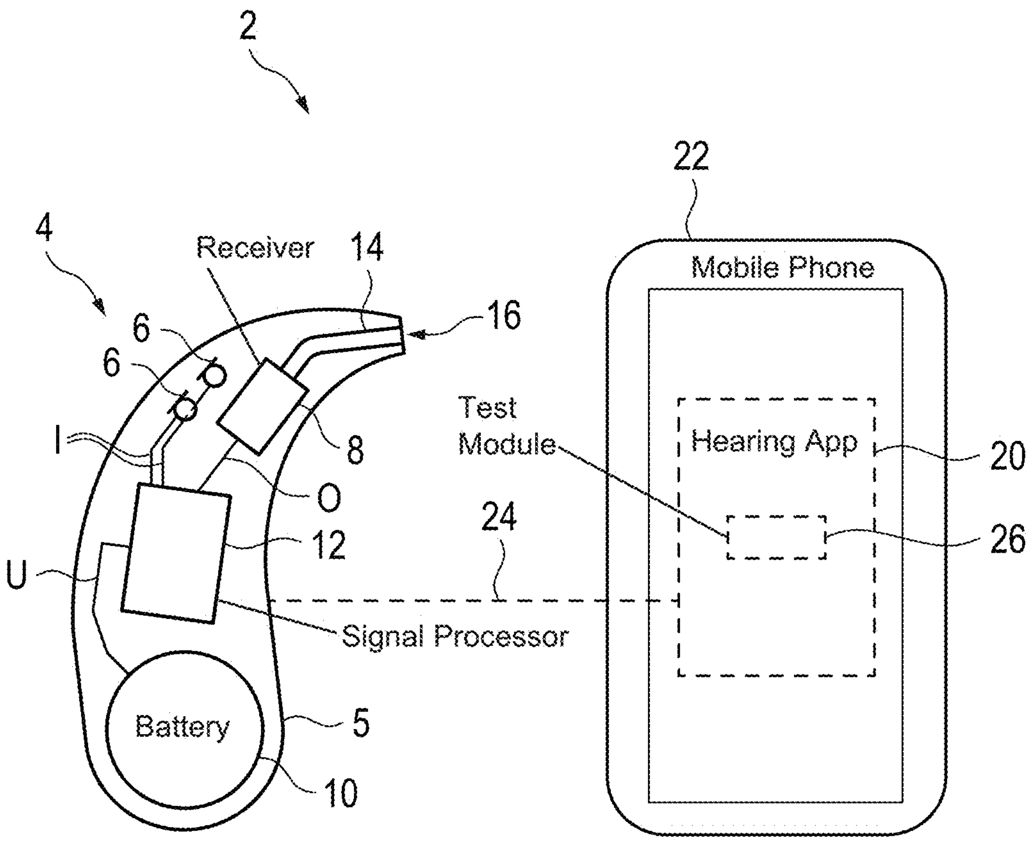
FIG. 1 is an illustration of a hearing system having a hearing aid and a software application (hearing app) installed on a smartphone of a hearing aid wearer, wherein a method for assessing speech intelligibility of the wearer according to the invention is implemented as a function of the hearing app.

Referring now to the figures of the drawings in detail and first, particularly to FIG. 1 thereof, there is shown a hearing system 2 containing a hearing aid 4, i.e., a hearing instrument being configured to support the hearing of a hearing-impaired user, that is configured to be worn in or at one of the ears of the user. As shown in FIG. 1, by way of example, the hearing aid 4 may be configured as a Behind-The-Ear (BTE) hearing aid. Optionally, the system 2 contains a non-illustrated second hearing aid to be worn in or at the other ear of the user to provide binaural support to the user.

The hearing aid 4 contains, inside a housing 5, two microphones 6 as input transducers and a receiver 8 as output transducer. The hearing aid 4 further comprises a battery 10 and a signal processor 12. Preferably, the signal processor 12 contains both a programmable sub-unit (such as a microprocessor) and a non-programmable sub-unit (such as an ASIC).

The signal processor 12 is powered by the battery 10, i.e., the battery 10 provides an electric supply voltage U to the signal processor 12.

During normal operation of the hearing aid 4, the microphones 6 capture an airborne sound signal from an environment of the hearing aid 2. The microphones 6 convert the airborne sound into an input audio signal I (also referred to as the "captured sound signal"), i.e., an electric signal containing information on the captured sound. The input audio signal I is fed to the signal processor 12. The signal processor 12 processes the input audio signal I, e.g., to provide a directed sound information (beam-forming), to perform noise reduction and dynamic compression, and to individually amplify different spectral portions of the input audio signal I based on audiogram data of the user to compensate for the user-specific hearing loss. The signal processor 12 emits an output audio signal O (also referred to as the "processed sound signal"), i.e., an electric signal containing information on the processed sound to the receiver 8. The receiver 8 converts the output audio signal O into processed airborne sound that is emitted into the ear canal of the user, via a sound channel 14 connecting the receiver 8 to a tip 16 of the housing 5 and a flexible sound tube (not shown) connecting the tip 16 to an ear piece inserted in the ear canal of the user.

Further to the hearing aid 4, the hearing system 2 contains a software application (subsequently denoted "hearing app" 20), that is installed on a mobile phone 22 of the user. Herein, the mobile phone 22 is not a part of the system 2. Instead, it is only used by the hearing system 2 as an external resource providing computing power, data storage (memory) and communication services.

The hearing aid 4 and the hearing app 20 exchange data via a wireless link 24, e.g., based on the Bluetooth standard. To this end, the hearing app 20 accesses a wireless transceiver (not shown) of the mobile phone 22, in particular a Bluetooth transceiver, to send data to the hearing aid 4 and to receive data from the hearing aid 4.

The hearing app 20 includes functions to remote control, configure and update the hearing aid 4. Furthermore, hearing app 20 includes a software module (subsequently referred to as the test module 26) that is designed to perform a method for assessing speech intelligibility of the wearer.

According to the method, the test module 26 repeatedly starts a speech intelligibility test (SI test), when the user of the hearing system 2 is wearing the hearing aid 2. In different embodiments, the execution of the SI test may be triggered:

- by command of the user (e.g. whenever the user activates a start button at a user interface of the hearing app 20 that is presented to the user via a screen of the mobile phone 22), and/or
- in regular, irregular, or random intervals (preferably several times per day), and/or
- whenever the test module 26 detects that the acoustic environment of the hearing system has changed; the test module 26 may evaluate the acoustic environment itself, by analyzing a sound signal recorded by the mobile phone or the hearing aid 4; however, preferably, the test module 26 accesses a sound class variable created by a sound classifier of the hearing aid 4 and attributing the current acoustic environment to one of a number of predefined sound classes (e.g. one of "speech", "music", "noise", "speech in noise", etc.); in the latter case, the test module 26 starts the SI test whenever the classifier variable changes its value; alternatively, the test module 26 checks the acoustic environment in regular intervals (e.g. by analyzing the acoustic environment itself or accessing the sound class variable created by the sound classifier of the hearing aid 4) and starts the SI test whenever the user is in a predefined situation of interest and a certain minimum time from the last SI test (or the last SI test in that situation of interest) has passed.

If the execution of the SI test can be triggered individually by the user, the user can choose to execute the test in situations that matter to him. The automatic triggering may be configured by the health care professional in advance (e.g. the health care professional can specify the number of triggers and the hearing situations he is interested in). Execution of the SI test may also be triggered automatically by the hearing system 2, when the hearing system 2 determines that more data for particular situations are needed. In case of an individual trigger of an SI test, the user can decide how his test results will be used: either for creating a new hearing aid program for that situation, for changing an existing hearing aid program or for one time gain adjustment for the current situation.

In the SI test, the test module 26 consecutively plays a small number of (e.g. 10 or 12) phonemes to the user. The phonemes may be played via a speaker of the mobile phone 22. However, preferably, the phonemes are presented by streaming a corresponding audio signal representing the phonemes to the hearing aid 4, in which case the phonemes are output via the receiver 8 to the ear canal of the user.

Thus, the SI test can also be performed in crowded places (e.g. a bus or shopping center) without disturbing other people.

The test module 26 selects the phonemes to be presented to the user from number of stored phonemes, e.g. contains "abba", "adda", "affa", "agga", "akka", "alla", "amma", "anna", "appa", "assa", "*atta*", "awwa", "azza", "asha", etc. Preferably, the order of the phonemes to be presented to the user is randomly selected. Also, preferably, the same phoneme may be selected more than once in the SI test.

In addition or as alternative to the above phonemes that are always embedded in the "a" vowel variety ("affa", "assa", etc.), the stored phonemes may comprise consonant phonemes in different vowel environments, e.g. "effe", "esse", "iffi", "issi", etc. In particular, the vowel environment may be selected by the test module 26 in order to adjust the level of difficulty of the SI test as the different vowel environments have different influence on the intelligibility of the embedded consonant (in an "a" environment, the consonant is easiest to recognize, an "e" environment is the second simplest, and an "i" environment is most difficult. Moreover, additionally or alternatively to the phonemes mentioned above, the stored phonemes may comprise vowels in a consonant environment (e.g. "mamm", "momm", "mumm" or "lall", "loll", etc.), in order to test the intelligibility of the vowels themselves.

In an embodiment, the test module 26 randomly selects the phonemes to be presented to the user. In another embodiment, the test module 26 selects the phonemes to be presented to the user in dependence of a phoneme difficulty attributed to each phoneme and in dependence of the acoustic environment; e.g. phonemes of lower phoneme difficulty are selected with higher preference in complex acoustic environments, whereas phonemes of higher phoneme difficulty are selected with higher preference in quiet. In yet another embodiment, the test module 26 selects a phoneme of medium phoneme difficulty first and successively increases the phoneme difficulty of the phonemes to the presented if and as long as the user correctly identifies the last presented phoneme. Otherwise, i.e. if the user fails to correctly identify a presented phoneme, the test module 26 selects the next phoneme with a lower phoneme difficulty.

Figure 2:
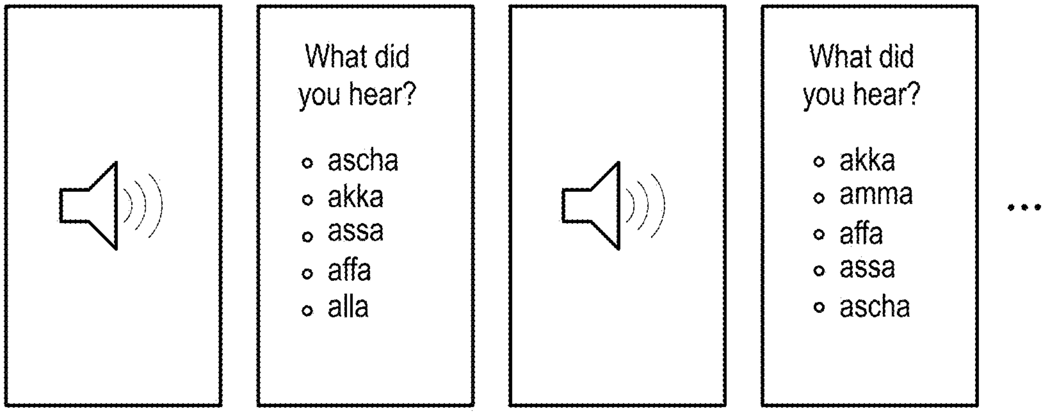
FIG. 2 is an illustration showing a scheme of the test procedure (SI test) performed by the method.

Simultaneously or after playing each of the phonemes to the user, the test module 26 invites the user, by a message displayed on the screen of the mobile phone 22, to indicate the phoneme, the user believes to have heard. Preferably, the test module 26 provides said invitation as a multiple-choice selection offering several phonemes (in particular several similar phonemes) for selection by the user (FIG. 2). Optionally, the test module may offer repeated trials if the user fails to select the right phoneme.

The test module 26 then stores the results of the SI test comprising, e.g.:

- the number of phonemes correctly recognized by the user, and/or
- the phonemes not recognized by the user, and/or
- the phonemes confused with other phonemes (e.g. in a phoneme confusion matrix), and/or
- if applicable, the number of trials to correctly indicate a given phoneme, and/or
- the time the user needed to correctly indicate the phoneme.

Together with the results of the SI test, the test module 26 assesses and stores characteristics of the acoustic environment of the hearing system 2, by analyzing a sound signal recorded by the mobile phone or the hearing aid 4 and/or accessing a sound class variable provided by a sound classifier of the hearing aid 4 as described above.

Additionally or alternatively, the test module 26 presents a number of questions relating to the subjective speech intelligibility or subjective contextual information to the user, via a message displayed on the screen of the mobile phone 22, and stores the answers (i.e. subjective ratings) of the user; preferably, the questions include questions for:

- the listening intention of the user (e.g. to be answered by the user by selecting an answer from a multiple-choice list),
- rate of occurrence of the specific acoustic situation (e.g. to be answered on a scale between 0 and 4),
- the mood of the user (e.g. to be answered by the user by selecting an answer from a multiple-choice list),
- the stress level of the user (e.g. to be answered on a scale between 0 and 10),
- the listening effort of the user (e.g. to be answered on a scale between 0 and 10), and
- the subjective level of understanding (e.g. to be answered on a scale between 1 and 4).

For instance, the question the subjective level of understanding may be provided to the user as follows:

"How did you understand in this situation (Please select)?
very good
good
bad
very bad.

Examples for subjective questions about contextual information may be provided to the user as follows:

"What sounds were audible in the background during the speech intelligibility test (Please select)?
voices/other people,
traffic noise,
household noise,
wind,
music,
other, and
no sounds (silence).

How often are you in a similar situation (Please select)?
very often,
often,
sometimes,
rarely.

How important is it in this situation to hear well?
very important,
somewhat important,
not so important.

Optionally, the test module 26 assesses and stores further contextual information like information on the kind of background noise and information on the location of the user; e.g. the user may be provided with the following question and multiple-choice options:

"Where are you right now (Please select)?
inside (home environment),
inside (public place),
outside,
transport (car)
transport (bus, train etc.)
other".

In order to better assess the reliability of the SI test, the test module 26 may also ask the user whether (or how well) the user, in his or her current situation, can see faces of potential conversation partners. The user's answer to this question, which is stored or automatically evaluated by the test module 26, allows to consider the influence of lip reading on the actual speech intelligibility of the user in this situation. If the user has an unaffected view to the face(s) of his or her conversation partner(s), e.g. when sitting opposite the conversation partners in a short distance, then lip reading will normally have a significant influence to the speech intelligibility and, thus, the SI tests is likely to underestimate the actual speech intelligibility of the user. Otherwise, i.e. in situations in which the user has no clear view the face(s) of his or her conversation partner(s), e.g. when speaking with a remote conversation partner or when sitting next to the conversation partner in a bus or plane, then lip reading cannot influence the speech intelligibility and the SI test is likely to reproduce the actual speech intelligibility of the user realistically.

The questions are presented to the user immediately before or after performing the SI test.

Further additionally or alternatively, the test module 26 may store current hearing aid settings at the time the SI test is performed.

The test module 26, thus, creates an EMA study containing real-time data that reflect the speech intelligibility of a user in well-defined normal life situations.

The results of the multiple SI tests (e.g. comprising the speech recognition performance, a phoneme confusion matrix, or the reaction time) are clustered by the test module 26, for similar situations being characterized, e.g. by similar acoustic environments and/or by similar subjective ratings to get more accurate information on the individual hearing of the user, the listening effort, individual preferences for situations, etc.

In the example described above, the method has been described as been implemented in a hearing system containing the hearing aid 4 and the hearing app 20 wherein the method is implemented as a functional part of the hearing app 20. However, in further embodiments of the invention, the method described above may also be implemented in a stand-alone app to be installed in a computer, in particular a smartphone. In this case, the method can be used independently of the hearing system or a hearing aid.

Preferred use cases:

Objective assessment of hearing loss in normal life situations:

Before a person is diagnosed with a hearing loss, there is often a period of time, where difficulties with speech understanding in noise are present every now and then. In this time period, the person becomes unsure whether this is a real or imagined difficulty. In this period, the hearing can fluctuate, which makes the whole situation even more confusing and difficult to diagnose.

Additionally, persons with a beginning hearing loss often refuse to take definitive action to get a hearing aid. Using the method according to the invention, there is a possibility to repeat objective measures in situations where the difficulties are present, in order to gain insight into the severity of the problem. Also, the results can be used to inform a health care professional about the severity of the problem and the fluctuations of the hearing loss.

This is of particular relevance in cases of hidden hearing loss, which is characterized by normal hearing thresholds, but weak speech understanding in noisy environments; which cannot be diagnosed with a pure-tone audiogram.

Support in the Choice of a Hearing Aid:

When a person decides to get a hearing aid, the health care professional will often offer different types of hearing aids (BTE, ITE, different price points). Subjective hearing loss is often not correlated with an objective hearing impairment (e.g. because for example hearing problems can be partially compensated by lip reading). Also, subjective feedback depends not only on the hearing loss, but also on the personality and expectations of the hearing aid candidate. Therefore, for a more complete picture of the needs of the hearing aid candidate, an objective measure of speech intelligibility can be provided by the method according to the invention. This facilitates for both the hearing aid wearer and the health care professional the choice of hearing aid.

Improved Fine Tuning

Currently, the fine tuning of hearing aids is performed after the person collects first experiences with the hearing aid in real life. The method according to the invention results facilitates for the health care professional to fine tune a hearing aid, as it reflects objective difficulties of the hearing aid wearer in real life situations.

Improved diagnosing, fitting, and programming of over-the-counter hearing aids:

Over-the-counter (OTC) hearing aids are applied without intensive on-site guidance and monitoring by a health care professional. In these cases, the method according to the invention allows for adjusting the gain of the hearing aid without performing an audiogram, or in addition to the audiogram measurement. In view of the contextual information and the results of multiple SI tests (e.g. presented as a confusion matrix), an automized OTC system or a remotely working health care professional can decide how many and what type of programs a hearing aid of the user would need to have for certain situations. Such programs may then be applied automatically by the system (based on the current contextual information), or by informing the user, while in the appropriate situation, that he/she can choose to use a specific program for this situation.

Hearing Aid/Automatic OTC Gain Adjustment

Often, in course of the hearing aid usage and/or phoneme training, the hearing aid wearer will acclimatize to the prescribed gain. Also, often, the hearing loss will fluctuate over days, weeks, months or get worse. Results of the method according to invention can be used to discover such changes in speech understanding; and the gain can be readjusted accordingly either automatically or by the health care professional.

Gain Adjustment Button

Often, the hearing aid wearer will have a feeling that he or she has a worse speech understand as compared to normal hearing people in the same situation, and will therefore wish to have a gain boost for that particular situation. One solution is the "boost button" on the hearing app. However, the needed gain can be easily overestimated or underestimated by the hearing aid wearer. The results of the method according to invention provide a precise assessment the hearing aid wearer's real speech understanding in a specific situation, and can precisely determine an amount of gain needed.

Evaluation and Development of Hearing Aid Features

The method according to the invention can be used to provide insight into benefit of a hearing aid feature in real life during feature development as well as clinical studies. It can also be used to determine unmet needs of the hearing aid wearer and, thus, influence feature development.

In the following, a test procedure is explained in more detail on the basis of FIG. 2 and FIG. 3.

The user hears a phoneme played through the hearing aid 4 (for example via streaming), without visual presentation on the mobile app. After hearing the phoneme, he/she is provided with an option of answering on the screen (of the mobile phone 22), where e.g. 5 different phonemes are displayed (including the phoneme he/she just heard), see FIG. 2. When the user answers, the 2nd phoneme is played. In this embodiment, there is no (immediate) feedback as to the right/wrong answers.

In an alternative embodiment, the test is presented in a completely auditory form (so that the user answers by saying the phoneme he/she thinks is the correct one aloud (no visual presentation of the possible alternative answers on the mobile phone 22 is needed). The answer can be analyzed by a speech-to-text algorithm either in the hearing app 20 or by the hearing aid 4 itself.

Figure 3:
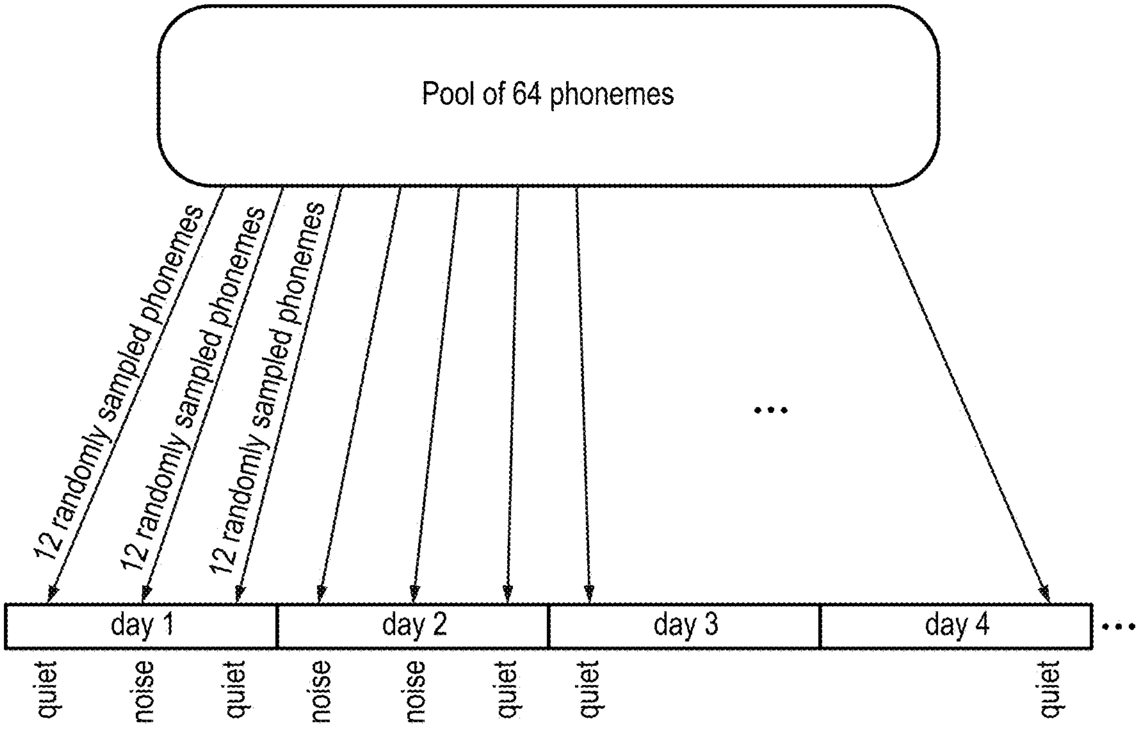
FIG. 3 is an illustration showing a scheme of performing the SI test multiple times in four days in different acoustic environments wherein, for each SI test, 12 phonemes are selected randomly from a phoneme pool of 64 phonemes.

Preferably, the test procedure is repeatedly performed in different acoustic environments within a period of several days, see FIG. 3. Herein, for the SI tests, N phonemes (e.g. N=12) may be randomly selected such that, after several tests, all 64 phonemes (or, at least, most of them) are covered.

The duration for the single SI test depends on the number of phonemes in each single test. For 12 phonemes, the SI test takes an average time of 65 seconds. In an embodiment, each SI test comprises presentation of e.g. of four phonemes with low phoneme difficulty, four further phonemes with medium phoneme difficulty and four further phonemes with high phoneme difficulty. In an alternative embodiment, as mentioned above, the SI test is configured such that easier phonemes are selected in noise and harder phonemes are selected in quiet, to avoid floor and ceiling effects.

The hearing app 20 then computes the percentage of correct answers, average reaction time and a confusion matrix. The following shows an example for a confusion matrix for three different phonemes “sh”, “f” and “s”:

| | Heard phonemes | | |
|---|---|---|---|
| Played phonemes | Asha | affa | assa |
| asha | 1 | 0 | 0 |
| affa | 1 | 0 | 0 |
| assa | 1 | 0 | 0 |

The confusion matrix is a means for showing the most frequent confusions between two consonants. It correlates the played phonemes to the heard (i.e. understood) phonemes; e.g., in the case of the exemplary table above, the consonant “sh” (“asha”) was recognized once correctly, whereas each of consonants “f” (“affa”) and “s” (“assa”) was misrecognized once as consonant “sh” (“asha”).

As speech intelligibility strongly depends on the listening situation, test results are not pooled over all situations, but evaluated separately for different situations (as classified by objective data from the hearing aid or subjective descriptions of the listening situation).

In a first implementation, the invention is configured to support the hearing aid wearer doing SI tests at home via streaming.

In this case, the SI test is integrated in the hearing app 20 as described above. The hearing aid wearer uses the hearing app 20 and the hearing aid 4 (or both hearing aids 4 of a binaural hearing system 2) are connected to the mobile phone 22. The SI test will be played via the hearing app 20 and will be sent via Bluetooth to the hearing aid(s) 4. The hearing aid wearer is invited to choose the phoneme that he/she heard streamed from the hearing aids 4.

In a second implementation, the method is configured to help to improve the hearing aid fitting (for several acoustic situations).

During performance of the method, data of the speech recognition performance, reaction time and confusion matrix is collected.

The confusion matrix is used, either automatically by the hearing app 20 or a cloud computer connected to the hearing app 20 or manually by a health care professional, to:

- evaluate the hearing loss of the hearing aid wearer, by comparing the confusions with the known typical frequencies of the consonants (e.g. speech banana, see FIG. 4),
- evaluate and choose the fitting rationale for the hearing aid wearer: Confused consonants show that there is not enough gain in specific frequencies which helps to decide which fitting rationale has the most benefit for the hearing aid wearer, and
- support the fine tuning of the hearing aids: The number of confusions for a certain consonant indicates the amount of gain needed for that consonant recognition. This allows the health care professional or the user to adjust gain on the frequency-specific basis.

In an embodiment of invention, one confusion matrix may be prepared for all SI tests (independent of the acoustic environment). However, preferably, a separate confusion matrix is prepared for a least one specific environment; i.e. only SI tests performed in this specific environment (e.g. noise with a lot of energy in high frequencies) are considered for preparation of the confusion matrix. This gives the healthcare professional information for choosing the fitting formula (e.g. with more gain in high frequencies), or for creating a dedicated hearing aid program for that type of environment.

Figure 4:
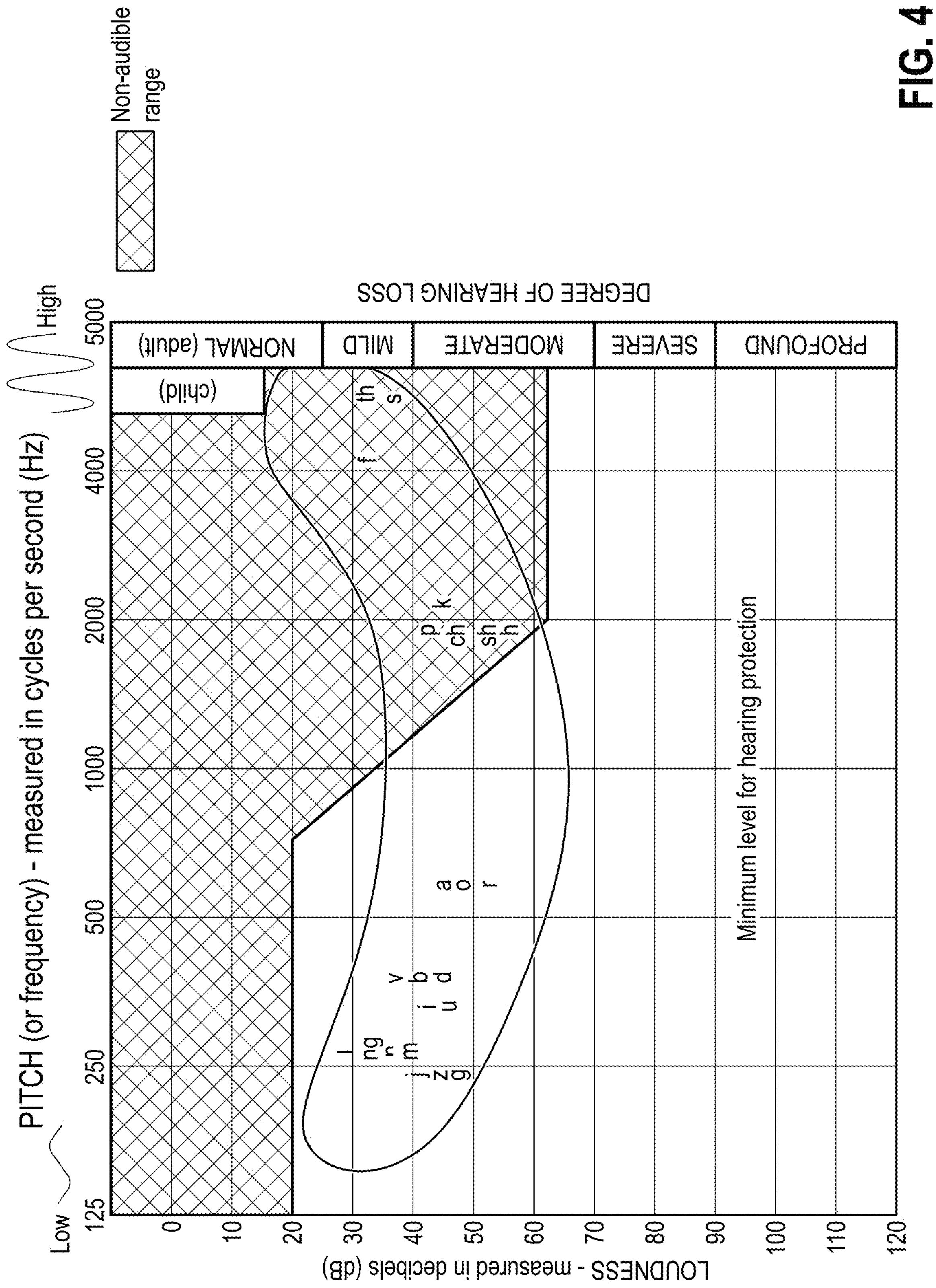
FIG. 4 is graph showing a typical frequency-loudness distribution of speech sounds ("speech banana") including values of the most typical frequency and loudness of different consonants and vowels (adapted from https://earcommunity.org/hearing-loss/emotional-support/how-to-explain-hearing-loss/) and the audible and inaudible frequency ranges for an exemplary hearing loss.

An example of a speech banana is shown in FIG. 4. FIG. 4 shows, in a diagram of loudness against sound frequency, a typical frequency-loudness distribution of speech sounds. The phonemes (“j”, “z”, “g”, . . . ) shown in this diagram mark the respective values of the most typical frequency and loudness for the respective phoneme; e.g., as can be seen from FIG. 4, the consonant “I” has a most typical sound frequency of ca. 275 Hz and a most typical loudness of 30 dB.

FIG. 4 also shows the audible and inaudible (non-audible) frequency ranges for an exemplary hearing loss which is a typical case of age-related hearing loss. In the exemplary case, the hearing threshold at low frequencies (below ca. 700 Hz) is at 20 dB, thus in the range of normal hearing. However, the hearing threshold increases for medium frequencies of 700 Hz-2 KHz and reaches an increased level of ca. 60 dB for high frequencies (ca. above 2 kHz). A person having this exemplary type of hearing loss would be able to hear and understand phonemes such as “a”, “m”, “n”, “j”, “v”, “z” etc. However, without support by a correctly fitted hearing aid, this person would be likely to confuse high-frequency consonants such as “sh” and “s”.

In order to define phoneme difficulty for the type of hearing loss shown in FIG. 4:

- low phoneme difficulty is attributed to phonemes having a most typical frequency below 700 Hz (e.g. “a”, “m”, “n”, “j”, “v”, “z”),
- a high phoneme difficulty is attributed to phonemes having a most typical frequency above 2 kHz (e.g. “k”, “f”, “s”, “th”), and
- a medium high phoneme difficulty is attributed to phonemes having a most typical frequency between 700 Hz and 2 kHz (e.g. “h”, “sh”, “ch”, “p”).

On the other hand, if the hearing loss is predominantly in low-to-mid-frequency sounds, nasal consonants (m, n) are less easily understood and are, thus attributed to a medium or high phoneme difficulty.

Speech intelligibility also strongly depends on the noise level of the environment of the hearing aid user. Thus, the acoustic environment may be determined when performing each SI test, either by collecting and analyzing sound data (e.g. via the hearing aid) or by asking the user to specify the sound environment (e.g. by specifying whether competing sounds are present). This allows grouping the results of the SI tests for different acoustic environments. For example, such grouping could involve a grouping of the results of the SI tests for the subjectively reported kinds of noise (e.g. traffic noise, voices in the background, wind) or groupings according to objective sound data (e.g. situations above or below a noise floor level of 65 dB SPL, or the hearing aid classifier detecting speech/no speech).

Also, acoustic situations may differ in their rate of occurrence and/or their importance for the hearing aid wearer (listening intention). Preferably, this information is used to weigh the most frequent and important situations more than rare or less important situations.

In an embodiment of the invention, the user is invited to specify the importance of good understanding in a particular situation of interest. For the identified situation of interest, the difficult phonemes are identified through the test, for the given noise. This situation may be repeated in a comparable environment (having the same characteristics and the same importance to the hearing aid user).

It will be appreciated by persons skilled in the art that numerous variations and/or modifications may be made to the invention as shown in the specific examples without departing from the spirit and scope of the invention as broadly described in the claims. The present examples are, therefore, to be considered in all aspects as illustrative and not restrictive.

The following is a summary list of reference numerals and the corresponding structure used in the above description of the invention:

2 hearing system
4 hearing aid
5 housing
6 microphone
8 receiver
10 battery
12 signal processor
14 sound channel
16 tip
20 hearing app
22 mobile phone
24 wireless link
26 test module
1 input audio signal
O output audio signal
U voltage

The invention claimed is:

1. A method for assessing speech intelligibility of a test participant, which comprises the steps of:
- performing a plurality of speech intelligibility tests in normal life situations of the test participant, using a mobile device carried by the test participant;
- performing each of the speech intelligibility tests by presenting acoustically a plurality of phonemes or phoneme combinations to the test participant, wherein the test participant is invited to indicate a presented phoneme or phoneme combination; and
- storing results of each of the speech intelligibility tests;
- evaluating an acoustic environment of the test participant in which the mobile device is carried;
- issuing an invitation to carry out a speech intelligibility test of the plurality of speech intelligibility tests to the test participant whenever a change of the acoustic environment is detected; and
- storing, for each speech intelligibility test performed, information characterizing the acoustic environment in which the respective speech intelligibility test is performed, together with results of the respective speech intelligibility test.

2. The method according to claim 1, wherein the information characterizing the acoustic environment includes an indication of a mean or maximum sound level, a fluctuation of a sound level and/or a sound spectrum of a signal recorded in an environment of the test participant at a time a respective one of the speech intelligibility tests is performed.

3. The method according to claim 1, wherein the information characterizing the acoustic environment includes an indication of a sound class determined by a sound classifier at a time each of the speech intelligibility tests is performed.

4. The method according to claim 1, wherein at least one question relating to a subjective speech intelligibility or a subjective context of a speech intelligibility test is presented to the test participant immediately before or after performing each one of the speech intelligibility tests, and wherein an answer of the test participant to each question is stored together with the results of a respective speech intelligibility test.

5. The method according to claim 4, wherein the at least one question relates to at least one of:
- a listening intention;
- a mood of the test participant;
- a stress level of the test participant; and
- a listening effort of the test participant.

6. The method according to claim 1, wherein the test participant wears a hearing instrument while each of the speech intelligibility tests is performed, and wherein at least one information item indicating a configuration or setting of the hearing instrument at a time a respective speech intelligibility test is performed is stored together with the results of the respective speech intelligibility test.

7. The method according to claim 1, wherein the test participant is a wearer of a hearing instrument.

8. A hearing system, comprising:
- a mobile device; and
- a hearing instrument configured to perform the method according to claim 1.

9. The hearing system according to claim 8, further comprising a software application installed on said mobile device.

10. A non-transitory computer-readable data storage medium comprising computer executable instructions which, when executed on a computer, cause the computer to carry out the method according to claim 1.

11. The non-transitory computer-readable data storage medium according to claim 10, wherein the computer is a computer of a mobile device.

* * * * *